US011739397B2

(12) United States Patent
Tsujie

(10) Patent No.: US 11,739,397 B2
(45) Date of Patent: *Aug. 29, 2023

(54) TITANIUM COPPER FOIL, EXTENDED COPPER ARTICLE, ELECTRONIC DEVICE COMPONENT, AND AUTO-FOCUS CAMERA MODULE

(71) Applicant: JX Nippon Mining & Metals Corporation, Tokyo (JP)

(72) Inventor: Kenta Tsujie, Kanagawa (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 17/290,825

(22) PCT Filed: Aug. 20, 2019

(86) PCT No.: PCT/JP2019/032486
§ 371 (c)(1),
(2) Date: May 3, 2021

(87) PCT Pub. No.: WO2020/095508
PCT Pub. Date: May 14, 2020

(65) Prior Publication Data
US 2021/0371957 A1 Dec. 2, 2021

(30) Foreign Application Priority Data
Nov. 9, 2018 (JP) .................................. 2018-211777

(51) Int. Cl.
*C22C 9/00* (2006.01)
*C21D 9/02* (2006.01)
(Continued)

(52) U.S. Cl.
CPC .................. *C22C 9/00* (2013.01); *C21D 9/02* (2013.01); *C22F 1/08* (2013.01); *G03B 3/10* (2013.01)

(58) Field of Classification Search
CPC .... C22C 9/00; C21D 9/02; C22F 1/08; G03B 3/10; G03B 30/00; G03B 13/36; G02B 7/08; G02B 7/28; G02B 7/09; B32B 15/01
See application file for complete search history.

(56) References Cited

U.S. PATENT DOCUMENTS 11,174,534 B2 * 11/2021 Tsujie ..................... B32B 15/01
11,180,829 B2 * 11/2021 Tsujie ..................... C22C 14/00
(Continued)

FOREIGN PATENT DOCUMENTS

EP  2610358 A1  7/2013
JP  9-78151     3/1997
(Continued)

OTHER PUBLICATIONS

Office Action in KR Application No. 10-2021-7014649 dated Oct. 20, 2022, 11 pages.
(Continued)

*Primary Examiner* — John A Hevey
(74) *Attorney, Agent, or Firm* — Marshall, Gerstein & Borun LLP

(57) ABSTRACT

Provided is a titanium copper foil which has required high strength when used as a spring, has an improved etching property, and has decreased settling, and which can be suitably used as a conductive spring material for use in electronic device parts such as autofocus camera modules. The titanium copper foil according to the present invention contains from 1.5 to 5.0% by mass of Ti, the balance being Cu and inevitable impurities, wherein in a Ti concentration (Continued)

curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in a thickness direction, and wherein the titanium copper foil satisfies 1.0% by mass$\leq H_H \leq$30% by mass, and $H_H/H_L \geq 1.1$, in which $H_H$ and $H_L$ are as defined in the present specification.

8 Claims, 7 Drawing Sheets

(51) Int. Cl.
 *C22F 1/08* (2006.01)
 *G03B 3/10* (2021.01)

(56) References Cited

U.S. PATENT DOCUMENTS

| | | | |
|---|---|---|---|
| 2004/0042928 | A1 | 3/2004 | Sasaki et al. |
| 2010/0132851 | A1 | 6/2010 | Gao et al. |
| 2016/0062074 | A1 | 3/2016 | Nagano |
| 2016/0062212 | A1* | 3/2016 | Nagano ............... G03B 3/10 428/606 |
| 2016/0304990 | A1 | 10/2016 | Horie |
| 2016/0326611 | A1* | 11/2016 | Horie ................ H01B 1/026 |
| 2020/0024698 | A1 | 1/2020 | Tsujie |
| 2021/0108288 | A1 | 4/2021 | Tsujie |

FOREIGN PATENT DOCUMENTS

| | | |
|---|---|---|
| JP | 2002-356726 A | 12/2002 |
| JP | 2004-091871 A | 3/2004 |
| JP | 2004-280031 A | 10/2004 |
| JP | 2009/115895 A | 5/2009 |
| JP | 2010-126777 A | 6/2010 |
| JP | 2011-208243 A | 10/2011 |
| JP | 2012/097306 A | 5/2012 |
| JP | 2014-037613 A | 2/2014 |
| JP | 2014/074193 A | 4/2014 |
| JP | 2014/080670 A | 5/2014 |
| JP | 2014-173145 A | 9/2014 |
| JP | 2015/096642 A | 5/2015 |
| JP | 2015/098622 A | 5/2015 |
| JP | 2015-127438 A | 7/2015 |
| JP | 2016/050341 A | 4/2016 |
| KR | 20150055055 A | 5/2015 |
| KR | 016-0096696 A | 8/2016 |
| WO | WO-2018/180428 A1 | 10/2018 |
| WO | WO-2018/180429 A1 | 10/2018 |

OTHER PUBLICATIONS

Extended European Search Report in EP Application No. 19883005.1 dated Nov. 29, 2021, 7 pages.
International Preliminary Report on Patentability and Written Opinion in International Application No. PCT/JP2019/032486 dated Aug. 20, 2019, 6 pages.
Search Report in International Application No. PCT/JP2019/032486 dated Nov. 26, 2019, 4 pages.
U.S. 2004/042928 A1 is an English language equivalent of JP 2004/091871.
U.S. 2010/132851 A1 is an English language equivalent of JP 2010/126777.
U.S. 2016/062074 A1 is an English language equivalent of JP 2016/050341.
U.S. 2016/304990 A1 is an English language equivalent of JP 2015/098622.

* cited by examiner

TITANIUM COPPER FOIL, EXTENDED COPPER ARTICLE, ELECTRONIC DEVICE COMPONENT, AND AUTO-FOCUS CAMERA MODULE

FIELD OF THE INVENTION

The present invention relates to a titanium copper foil, a copper rolled product, electronic device part, and an autofocus camera module. More particularly, it relates to a titanium copper foil, a copper rolled product, electronic device part, and an autofocus camera module, which are suitable for use as a conductive spring material, in particular for autofocus camera modules and the like.

BACKGROUND OF THE INVENTION

An electronic device part called an autofocus camera module is used in camera lens sections for mobile phones. An autofocus function of a camera for a mobile phone moves a lens in a fixed direction by spring force of a material used for an autofocus camera module, while moving the lens in a direction opposite to the spring force-acting direction by means of electromagnetic force generated by passing an electric current through a coil wound around the periphery. By such a mechanism, the camera lens is driven to exert the autofocus function (for example, Patent Literatures 1 and 2).

Therefore, a copper alloy foil for use in spring members of the autofocus camera modules requires spring strength sufficient to withstand deformation of the material due to the electromagnetic force. If the spring strength is low, the material cannot withstand displacement due to the electromagnetic force, and permanent deformation (settling) will occur so that the copper alloy foil cannot return to its initial position after unloading the electromagnetic force. If the settling occurs, the lens cannot move to a desired position and the autofocus function cannot be produced, when a constant current is passed.

For the autofocus camera modules, Cu—Ni—Sn based copper alloy foils having a foil thickness of 0.1 mm or less and tensile strength or 0.2% yield strength of 1100 MPa or more have been used. However, a recent demand for cost reduction has led to the use of titanium copper foils which have relatively low raw material costs than the Cu—Ni—Sn based copper alloy foils, and the demand for the titanium copper foil is thus increasing.

On the other hand, the strength of the titanium copper foil is lower than that of the Cu—Ni—Sn based copper alloy foil, causing a problem that settling occurs. Therefore, there is a need for increasing the strength of the titanium copper foil.

Means for increasing the strength of titanium copper includes, for example, those described in Patent Literatures 3 and 4. Patent Literature 3 discloses a method for producing titanium copper through the steps of a solutionizing treatment, a sub-aging treatment, cold rolling, and an aging treatment, in which a heat treatment after the solutionizing treatment is divided into two stages, thereby increasing a range of Ti concentration (concentration difference) due to spinodal decomposition and improving a balance between strength and bending workability. Patent Literature 4 also discloses that it is effective to increase the fluctuation of Ti concentration by a method for producing titanium copper through the steps of a solutionizing treatment, a preliminary aging treatment, an aging treatment, finish rolling, and strain relief annealing.

Other techniques for further improving the strength of titanium copper include those described in Patent Literatures 5 to 8. Patent Literature 5 discloses a method of adjusting an average crystal grain size by final recrystallization annealing, and then carrying out cold rolling and an aging treatment in this order. Patent Literature 6 discloses that cold rolling, an aging treatment and cold rolling are sequentially carried out after a solutionizing treatment. Patent Literature 7 discloses a method of adjusting an X-ray diffraction intensity of a {420} crystal plane on a plate surface by sequentially carrying out hot rolling and cold rolling, followed by a solutionizing treatment in which a temperature is maintained in a temperature range of from 750 to 1000° C. for 5 seconds to 5 minutes, and followed by cold rolling at a rolling ratio of 0 to 50%, an aging treatment at 300 to 550° C. and finish cold rolling at a rolling ratio of 0 to 30%. Patent Literature 9 discloses a method of adjusting a half-width of an X-ray diffraction strength of a {220} crystal plane on a rolled surface by sequentially carrying out a first solutionizing treatment, intermediate rolling, a final solutionizing treatment, annealing, final cold rolling, and an aging treatment under predetermined conditions.

Further, as a technique focusing on structural control, Patent Literature 9 discloses a method of improving a balance between strength and conductivity by subjecting a titanium copper having a composition containing Ti in a range of 0.5% by mass or more and 3.5% by mass or less, the balance being Cu and inevitable impurities, to finish cold or hot rolling at a rolling reduction ratio of more than 90% and an aging treatment to form a lamellar structure after the aging treatment.

Further, in order to suppress generation of settling in addition to the increasing of the strength, Patent Literature 10 discloses a method of controlling a surface roughness of a copper alloy foil by sequentially carrying out hot rolling and cold rolling, followed by a solutionizing treatment, cold rolling at a rolling reduction ratio of 55% or more, an aging treatment at 200 to 450° C. and cold rolling at a rolling reduction ratio of 35% or more. Further, Patent Literature 11 discloses that a ratio $I_{(220)}/I_{(311)}$ is controlled by sequentially carrying out hot rolling and cold rolling, followed by a solutionizing treatment, cold rolling at a rolling reduction ratio of 55% or more, an aging treatment at 200 to 450° C., cold rolling at a rolling reduction ratio of 50% or more, and optionally strain relief annealing, such that the rolling reduction ratio of the cold rolling after the solutionizing treatment is controlled. Each of Patent Literature 10 and Patent Literature 11 discloses that the titanium copper foil can achieve 0.2% yield strength of 1100 MPa or more in a direction parallel to the rolling direction.

Furthermore, Patent Literature 12 discloses that Young's modulus is decreased by carrying out hot rolling at 800 to 1000° C. to a thickness of 5 to 20 mm, cold rolling at a working ratio of 30 to 99%, pre-annealing at a softening degree of 0.25 to 0.75 by maintenance in a temperature range of from 500 to 650° C. for 5 to 80 seconds at an average temperature rising rate of 400 to 500° C. of 1 to 50° C./sec, cold rolling at a rolling reduction ratio of 7 to 50%, a solutionizing treatment at 700 to 900° C. for 5 to 300 seconds, and an aging treatment at 350 to 550° C. for 2 to 20 hours.

Further, Patent Literature 13 discloses a method of improving settling by carrying out hot rolling and cold rolling, and then a solutionizing treatment at 700 to 1000° C. for 5 seconds to 30 minutes and cold rolling at a rolling reduction ratio of 95% or more in this order, and then an aging treatment of increasing a temperature at a rate of 15°

C./h or less, maintaining the temperature in a range of from 200 to 400° C. for 1 to 20 hours, and decreasing the temperature to 150° C. at a rate of 15° C./h or less. Patent Literature 13 also discloses that the titanium copper foil can achieve a 0.2% yield stress of 1200 MPa or more in both a direction parallel to the rolling direction and a direction perpendicular to the rolling direction, and a spring deflection limit of 800 MPa or more in both a direction parallel to the rolling direction and a direction perpendicular to the rolling direction.

CITATION LIST

Patent Literatures

[Patent Literature 1]: Japanese Patent Application Publication No. 2004-280031 A
[Patent Literature 2]: Japanese Patent Application Publication No. 2009-115895 A
[Patent Literature 3]: Japanese Patent Application Publication No. 2015-098622 A
[Patent Literature 4]: Japanese Patent Application Publication No. 2015-127438 A
[Patent Literature 5]: Japanese Patent Application Publication No. 2002-356726 A
[Patent Literature 6]: Japanese Patent Application Publication No. 2004-091871 A
[Patent Literature 7]: Japanese Patent Application Publication No. 2010-126777 A
[Patent Literature 8]: Japanese Patent Application Publication No. 2011-208243 A
[Patent Literature 9]: Japanese Patent Application Publication No. 2014-173145 A
[Patent Literature 10]: Japanese Patent Application Publication No. 2014-037613 A
[Patent Literature 11]: Japanese Patent Application Publication No. 2014-080670 A
[Patent Literature 12]: Japanese Patent Application Publication No. 2014-074193 A
[Patent Literature 13]: Japanese Patent Application Publication No. 2016-050341 A

SUMMARY OF THE INVENTION

However, main objects of Patent Literatures 3 and 4 are to improve the strength and bending workability of the titanium copper, but these literatures do not focus on the problem of settling.

In some Examples and Comparative Examples described in the specifications of Patent Literatures 5 to 8, some titanium copper having a 0.2% yield stress of 1100 MPa or more can be found. However, the present inventors have found that the conventional techniques proposed in Patent Literatures 5 to 8 causes settling when a material is loaded, deformed and then unloaded, so that only high strength cannot allow the use of the titanium copper as a conductive spring material for autofocus camera modules or the like.

Further, Patent Literature 9 discloses that the strength increases due to the lamellar structure. However, the titanium copper described in Patent Literature 9 may be fractured in applications requiring higher strength, which will cause a problem that the titanium cupper will not function as a spring. Therefore, it is not appropriate in terms of achieving both strength and suppression of settling.

Patent Literatures 10 to 12 disclose a method of suppressing the generation of settling. However, it has been found that in the proposed techniques of Patent Literatures 10 to 12, the foil having a relatively thin thickness does not produce effects enough to be expected. That is, it has been found that although the proposed techniques of Patent Literatures 10 to 12 produce a significant effect for the foil having somewhat thick foil thickness, the foil having a thinner thickness does not produce a sufficient effect to be expected from the foil having the thicker foil thickness.

Patent Literature 13 describes a titanium copper foil having high strength and low settling. However, it does not focus on etching properties.

Further, in recent years, the number of lenses tends to increase due to high functionality of cameras such as the increase in the number of pixels of an image sensor. Therefore, when the camera module falls, a strong force that gives plastic deformation to the material is applied. Accordingly, there is a need for difficulty of settling over the prior art. Further, when the titanium copper foil is used for autofocus modules, the etching property (circuit linearity during etching) is one of important properties in addition to the foregoing, because a spring material is formed by etching.

In view of the above background, it is important that no settling occurs in recent camera modules, and in addition, a good etching property (circuit linearity during etching) is required. Therefore, there is still room for improvement of the above titanium copper foil.

An object of the present invention is to solve such problems. In one embodiment, an object of the present invention is to provide a titanium copper foil that has required high strength when used as a spring, and has an improved etching property, and has decreased settling. In another embodiment, an object of the present invention is to provide a rolled copper product including such a titanium copper foil. In yet another embodiment, an object of the present invention is to provide an electronic device part including such a titanium copper foil. In yet another embodiment, an object of the present invention is to provide an autofocus camera module including such a titanium copper foil.

As a result of studies for an effect of a metal structure on settling, the present inventors have found that a certain fine layered structure in the metal structure is effective for suppressing settling as well as improving the etching property and a low cycle fatigue characteristic. Further, the present inventors have found that such a fine layered structure of Cu and Ti can be obtained by adjustment of solidification velocity during casting and warm rolling after hot rolling.

Based on such findings, in an aspect, the present invention relates to a titanium copper foil comprising from 1.5 to 5.0% by mass of Ti, the balance being Cu and inevitable impurities, wherein in a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in a thickness direction, and wherein the titanium copper foil satisfies 1.0% by mass$\leq H_H \leq$30% by mass, and $H_H/H_L \geq 1.1$, in which $H_H$ and $H_L$ are as defined in the present specification.

In one embodiment, the titanium copper foil according to the present invention has a number of bends of 800 or more when a MIT test according to JIS P 8115: 2001 is conducted in a direction parallel to the rolling direction.

The titanium copper according to the present invention has a tensile strength of 1100 MPa or more in a direction parallel to the rolling direction.

In an embodiment, the titanium copper according to the present invention further comprises one or more elements selected from Ag, B, Co, Fe, Mg, Mn, Mo, Ni, P, Si, Cr and Zr in a total amount of 1.0% by mass or less.

In another aspect, the present invention relates to a copper rolled product comprising any one of the titanium copper foils as described above.

In another aspect, the present invention relates to an electronic device part comprising any one of the titanium copper foils as described above.

In an embodiment, the electronic device part is an autofocus camera module.

Further, in yet another aspect, the present invention relates to an autofocusing camera module comprising: a lens; a spring member for elastically biasing the lens to an initial position in an optical axis direction; and an electromagnetic driver configured to generate electromagnetic force for withstanding the biasing force of the spring member so that the lens can be driven in the optical axis direction, wherein the spring member comprises any one of the titanium copper foils as described above.

According to the present invention, it is possible to obtain a titanium copper foil having an improved etching property, and also having high strength and decreased settling, which can be suitably used as a conductive spring material for use in electronic device parts such as autofocus camera modules.

DETAILED DESCRIPTION OF THE INVENTION

Figure 1:
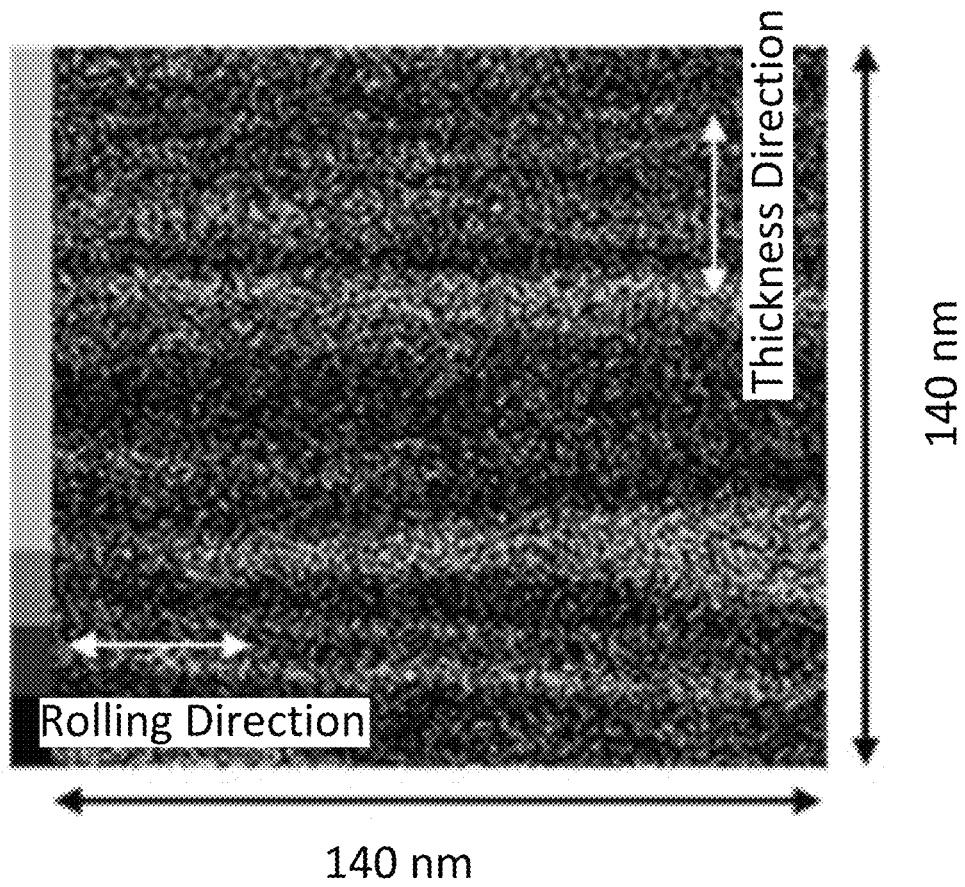
FIG. 1 is a Ti mapping view obtained by performing STEM-EDX analysis on a cross section parallel to a rolling direction of titanium copper according to an embodiment of a titanium copper foil of the present invention.

Hereinafter, specific embodiments of the present invention will be described in detail. The present invention is not limited to the following embodiments, and various modifications may be made without changing the spirit of the present invention.
[1. Titanium Copper Foil]

An embodiment of a titanium copper according to the present invention contains from 1.5 to 5.0% by mass of Ti, the balance being Cu and inevitable impurities. In a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in a thickness direction. The titanium copper foil satisfies 1.0% by mass$\leq H_H \leq$30% by mass, and $H_H/H_L \geq 1.1$, in which $H_H$ and $H_L$ are as defined below. As used herein, STEM-EDX refers to analysis by energy dispersive X-ray spectroscopy (EDX) using a scanning transmission electron microscope (STEM).
(Ti Concentration)

In an embodiment, the titanium foil copper according to the present invention has a Ti concentration of from 1.5 to 5.0% by mass. For the titanium copper foil, the strength and conductivity are increased by allowing solid solution of Ti into the Cu matrix with a solutionizing treatment and then dispersing fine precipitates in the alloy with an aging treatment.

The Ti concentration is 1.5% by mass or more, and preferably 2.5% by mass or more, and more preferably 2.7% by mass, from the viewpoint that precipitates are deposited without any excess or deficiency to obtain a desired strength. Further, the Ti concentration is 5.0% by mass or less, and preferably 4.5% by mass or less, and more preferably 4.3% by mass or less, from the viewpoint that the material is not easily cracked during rolling because of good workability.
(Other Additive Elements)

In one embodiment, the strength of the titanium copper foil according to the present invention can be further improved by containing one or more of Ag, B, Co, Fe, Mg, Mn, Mo, Ni, P, Si, Cr, and Zr in the total amount of 1.0% by mass or less. However, the total content of these elements may be zero, that is, these elements may not be contained. The reason why the upper limit of the total content of these elements is 1.0% by mass is that if it is more than 1.0% by mass, the workability is deteriorated and the material is easily cracked during rolling. In view of the balance between strength and workability, it is preferable to contain the above elements in the total amount of from 0.005 to 0.5% by mass. It should be noted that in the present invention, the desired effect can be obtained even if the above additive elements are not contained.

Further, an amount of Ag added is preferably 0.5% by mass or less, and more preferably 0.1% by mass or less. An amount of B added is preferably 0.5% by mass or less, and more preferably 0.05% by mass or less. An amount of Co added is preferably 0.5% by mass or less, and more preferably 0.1% by mass or less. An amount of Fe added is preferably 0.5% by mass or less, and more preferably 0.25% by mass or less. An amount of Mg added is preferably 0.5% by mass or less, and more preferably 0.1% by mass or less. An amount of Mn added is preferably 0.5% by mass or less, and more preferably 0.1% by mass or less. An amount of Mo added is preferably 0.5% by mass or less, and more preferably 0.3% by mass or less. An amount of Ni added is preferably 0.5% by mass or less, and more preferably 0.1% by mass or less. An amount of P added is preferably 0.5% by mass or less, and more preferably 0.1% by mass or less. An amount of Si added is preferably 0.1% by mass or less, and more preferably 0.05% by mass or less. An amount of Cr added is preferably 0.5% by mass or less, and more preferably 0.4% by mass or less. An amount of Zr added is preferably 0.5% by mass or less, and more preferably 0.1% by mass or less. However, it is not limited to the above addition amounts.
(Tensile Strength)

In an embodiment, the titanium copper foil according to the present invention can achieve a tensile strength in a direction parallel to a rolling direction of 1100 MPa or more, or even 1200 MPa or more. The tensile strength in the direction parallel to the rolling direction of 1200 MPa or more is a desirable characteristic for use as a conductive spring material for autofocus camera modules. In a preferred embodiment, both of tensile strengths in the direction parallel to the rolling direction and the direction perpendicular to the rolling direction are 1300 MPa or more, and in a more preferred embodiment, both are 1400 MPa or more.

On the other hand, the upper limit of the tensile strength is not particularly limited in terms of the strength intended by the present invention, but the tensile strengths in the directions parallel and perpendicular to the rolling direction are generally 2000 MPa or less, and typically 1800 MPa or less, taking labor and costs into account.

In the present invention, the tensile strength of the titanium copper foil in the direction parallel to the rolling direction is measured in accordance with JIS Z2241: 2011 (Metal Material Tensile Test Method).
(Low Cycle Fatigue Characteristic)

The low cycle fatigue characteristic is evaluated by the number of repeats (number of bends) until fracture by a bending test. In one embodiment of the titanium copper foil according to the present invention, the number of repeats until fracture by the bending test of, for example, 500 or more, or further 1000 or more, can be achieved. The number of repeats until fatigue by the bending test of 1000 or more is a preferable characteristic for use as a conductive spring material for autofocus modules. A higher number of bends leads to a better low cycle fatigue characteristic, and it is preferably 500 or more, and more preferably 800 or more, and further preferably 1000 or more. Since the low cycle fatigue characteristic refers to a characteristic that does not fracture a material when the material is flexed (bent), a material having high strength (a tensile strength or 0.2% yield stress) does not necessarily provide a good low cycle fatigue characteristic.

Further, in the present invention, the number of bends is measured by a MIT test according to JIS P 8115: 2001.
(Settling)

Figure 7:
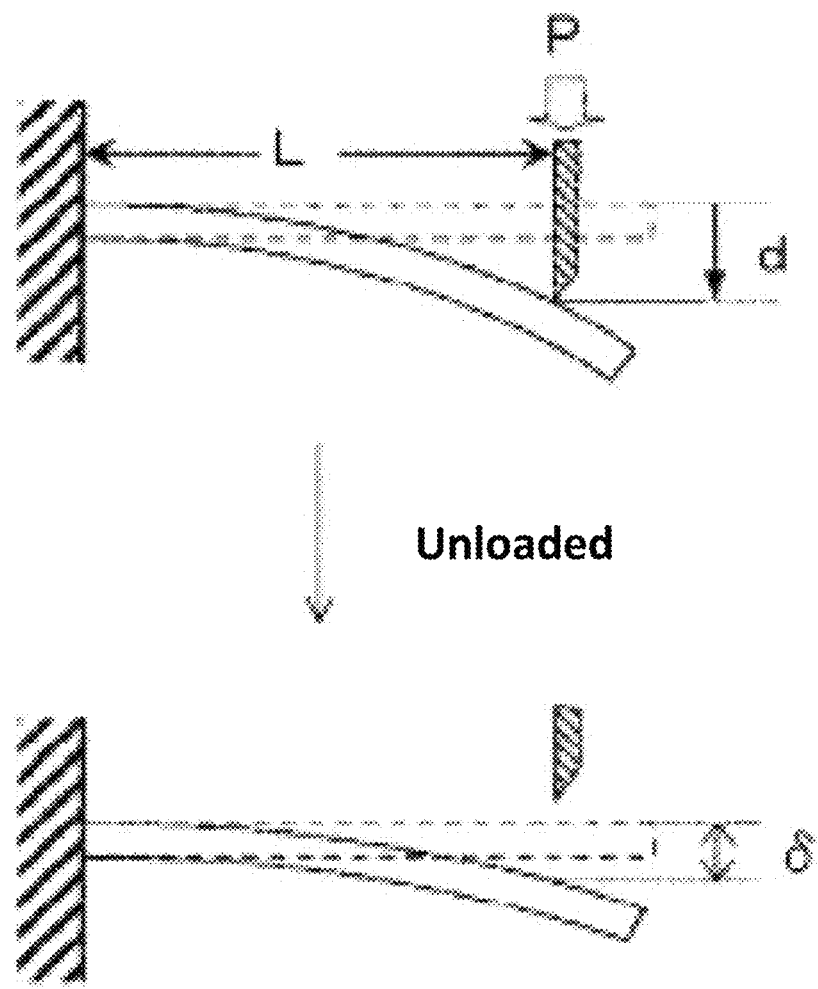
FIG. 7 is a schematic view showing a method for measuring an amount of settling.

For the settling, a strip sample is taken such that the titanium copper foil has a predetermined size, one end of the sample in the longitudinal direction is fixed, a punch whose tip is processed into a knife edge is pressed at a position of a distance L from the fixed edge to provide the sample with a deflection at a distance d, and the punch is then unloaded to return it to its initial position (see FIG. 7). After unloading the punch, an amount of sagging 6 is determined. A lower amount of settling leads to better settling resistance, and the amount of settling is preferably 0.3 or less, and more preferably 0.1 or less, and further preferably 0.05 or less, and even more preferably less than 0.01. For the test conditions, the L and d may be adjusted depending on the thickness of the sample.
(Etching Property)

The etching property is determined by etching the titanium copper foil using a predetermined etching solution to form a linear circuit having a predetermined size, and observing the circuit by STEM. Here, a lower difference between a maximum circuit width and a minimum circuit width leads to a better etching property. The difference is preferably less than 10 μm.
(Layered Structure)

Figure 2:
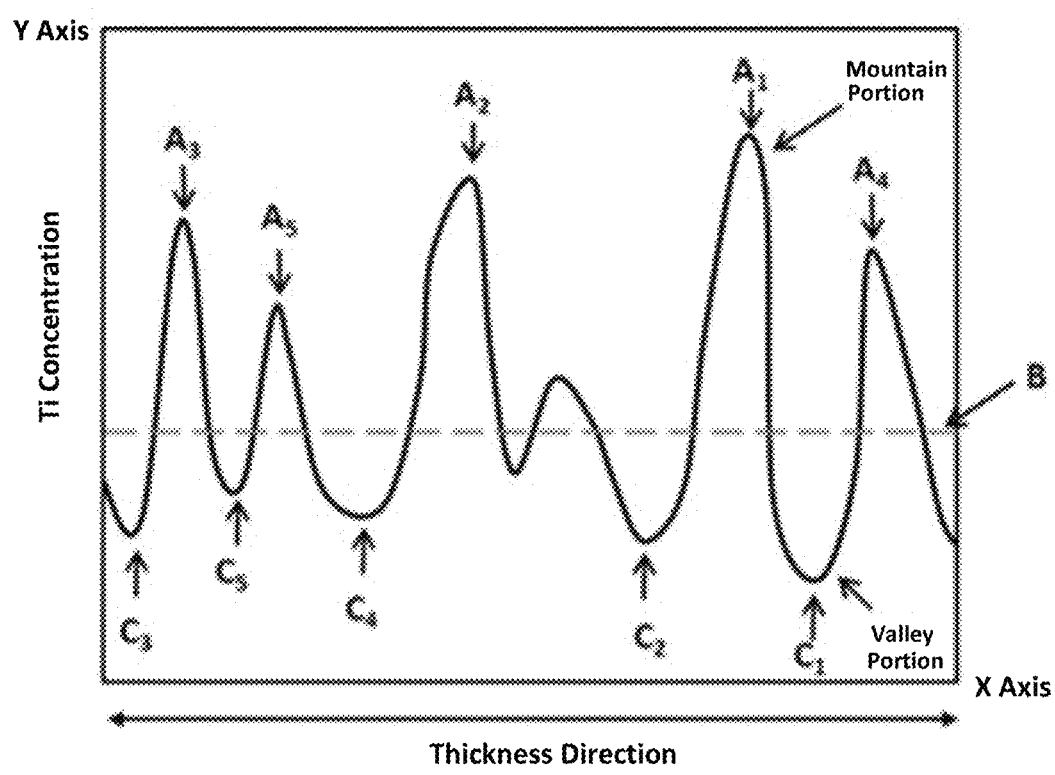
FIG. 2 is an example of a schematic view of a graph showing a Ti concentration curve in a thickness direction of a cross section parallel to a rolling direction, which is obtained by performing line analysis with STEM-EDX on a cross section parallel to the rolling direction according to an embodiment of a titanium copper foil of the present invention.

As illustrated in FIGS. 1 and 2, when performing analysis on the cross section in the direction parallel to the rolling direction by an energy dispersive X-ray spectroscopy (EDX) with a scanning transmission electron microscope (STEM) (STEM-EDX analysis), the titanium copper foil according to an embodiment of the present invention has a layered structure in which a lower concentration Ti layer having a Ti concentration less than an average concentration and a higher concentration Ti layer having a Ti concentration equal to or higher than the average concentration are alternately present in the thickness direction (the up and down direction in FIG. 1), in the cross section parallel to the rolling direction. In other words, in one embodiment, the titanium copper foil according to the present invention has a Ti concentration that changes in the thickness direction. That is, in the present invention, the titanium copper foil has a layered structure in which layers composed of Cu and higher concentration Ti and layers composed of Cu and lower concentration Ti are alternately present.

The stable and continuous presence of such a layered structure in the cross section parallel to the rolling direction enhances resistance to deflection and makes it difficult to generate permanent deformation, so that it would allow settling to be effectively suppressed even if the copper foil has a thin thickness of 0.1 mm or less, although this invention is not limited to such a theory.

The "layered structure" is defined as a structure in which the lower concentration Ti layer and the higher concentration Ti layer are alternately present in the thickness direction, and each layer is continuous over 50 nm or more in the rolling direction. That is, in the rolling direction, a change in the Ti concentration can be lower. On the other hand, a structure in which each layer has a length less than 50 nm in the rolling direction is defined as a speckled structure. That is, the change in Ti concentration is higher in the rolling direction than that of the layered structure.

A method for investigating the layered structure will be described as follows. For example, when the STEM-EDX analysis is carried out, a line analysis is first carried out in the thickness direction in one field of view (at magnifications of 1,000,000; observation field of view: 140 nm×140 nm) to provide a Ti concentration curve. Subsequently, at any one point in the Ti concentration for the Ti concentration curve, a line analysis is carried out in a direction perpendicular to the thickness direction (rolling direction) to determine a length in the rolling direction, in which a variation in the Ti concentration is in a range of ±5% with respect to the selected measured value. When the above length measurement is carried out three times in different fields of view, and when an average value of the lengths is 50 nm or more, the layered structure can be present.

Figure 3:
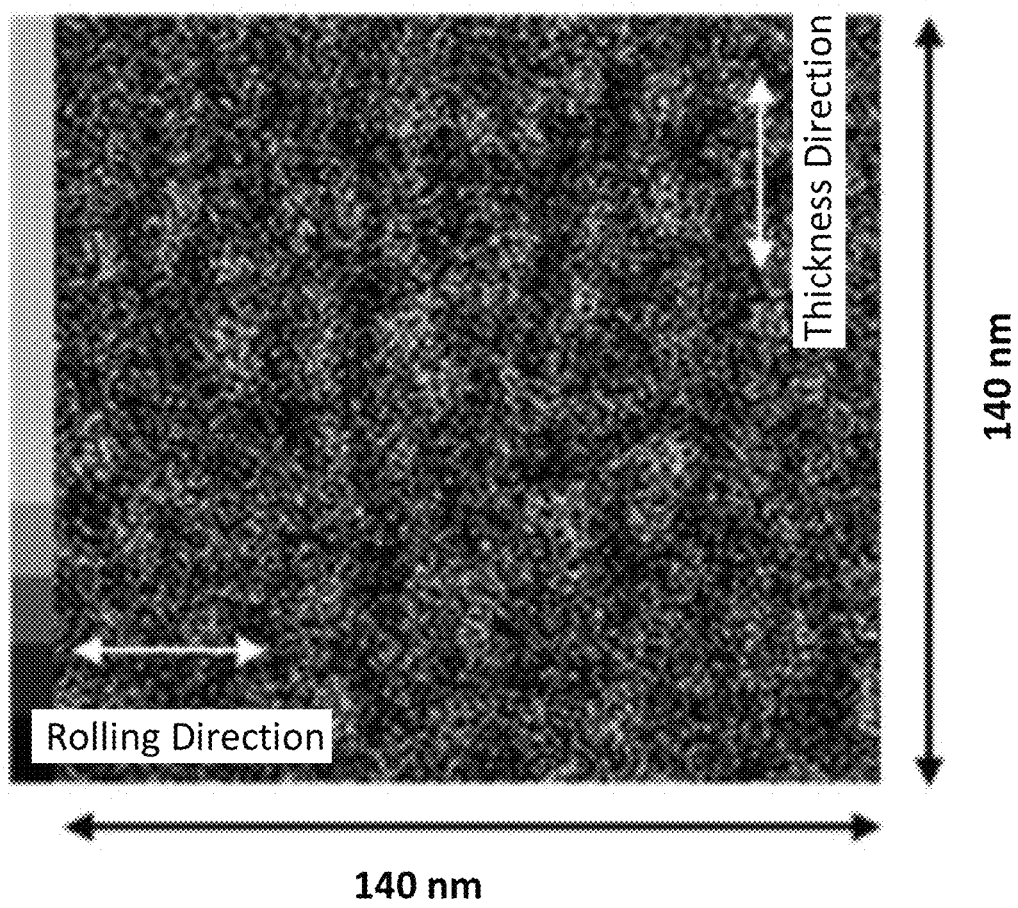
FIG. 3 is an example of Ti mapping views obtained by performing STEM-EDX analysis on a cross section parallel to a rolling direction of conventional titanium copper.

On the other hand, as shown in FIG. 3, the conventional titanium copper foil has a discontinuous and speckled distribution of a portion having a higher Ti concentration and a portion having a lower Ti concentration in the cross section parallel to the rolling direction, and has substantially uniform peak values for Ti concentrations in the thickness direction. In this case, the titanium copper having a thinner thickness has a discontinuous structure. Therefore, it does not have strong resistance against deflection, and easily generates permanent deformation within the elastic limit, so that the settling would be sufficiently suppressed.

Further, as an index representing the layered structure, a height of the higher concentration Ti layer in the thickness direction, and a ratio of a height of the higher concentration Ti layer to a height of the lower concentration Ti layer concentration can be defined.

This analysis is carried out by STEM-EDX analysis. When linear analysis of a cross section parallel to the rolling direction is performed by STEM-EDX in the thickness direction, the Ti concentration at each measurement point varies depending on the Ti concentration. In the present invention, the Ti concentration is observed per one visual field (at magnifications of 1,000,000; observation field of view: 140 nm×140 nm), and a Ti concentration curve with respect to a distance in the thickness direction is obtained as shown in FIG. 2. The higher concentration Ti layer and the lower concentration Ti layer in the Ti concentration curve are applied mutatis mutandis by replacing the contour curve for the surface properties as defined in JIS B 0601 with the Ti concentration curve. That is, the higher concentration Ti layer is defined as an average value of the Ti concentration curve or an upper portion where the Ti concentration becomes higher than the average value, among curve portions sandwiched between adjacent two intersections in an X axis direction when the Ti concentration curve is divided by B (the average value in the Ti concentration curve). Also, the lower concentration Ti layer is defined as a lower portion where the Ti concentration becomes lower than the average value of the Ti concentration curve, among curve portions sandwiched between adjacent two intersections in an X axis direction when the Ti concentration curve is divided by B (the average value in the Ti concentration curve).

(Height of Higher Concentration Ti Layer, and Height of Lower Concentration Ti Layer)

In order to obtain the titanium copper foil as described above, it is important to maintain a height $H_H$ of the higher concentration Ti layer in the Ti concentration curve at a certain level or more. The height $H_H$ is 1.0% by mass or more, and preferably 2.0% by mass or more, and more preferably 3.0% by mass or more, and even more preferably 4.5% by mass or more, in terms of exerting an improved low cycle fatigue characteristic. The height $H_H$ is preferably 30% by mass or less, and preferably 20% by mass or less, and more preferably 15% by mass or less, and even more preferably 10% by mass or less, in terms of improving the etching property.

A method for obtaining the height $H_H$ of the higher Concentration Ti layer and the height $H_L$ of the lower concentration Ti layer will be described as follows. As shown in FIG. 2, at 140 nm in the thickness direction, peak concentrations in the Ti concentration curve are selected and designated as $A_1$, $A_2$, $A_3$, $A_4$, and $A_5$ which have higher peak concentrations in this order, and the minimum concentrations at valley portions in the Ti concentration curve are selected and designated as $C_1$, $C_2$, $C_3$, $C_4$, and $C_5$ which have lower concentrations in this order, and when the average Ti concentration in the Ti concentration curve is B, the height $H_H$ of the higher concentration Ti layer is defined by the following equation (1), and the height $H_L$ of the lower concentration Ti layer is defined by the following equation (2):

$$H_H = \{(A_1-B)+(A_2-B)+(A_3-B)+(A_4-B)+(A_5-B)\}/5; \text{ and} \quad \text{Equation (1)}$$

$$H_L = \{(B-C_1)+(B-C_2)+(B-C_3)+(B-C_4)+(B-C_5)\}/5. \quad \text{Equation (2)}$$

The $H_H$ and $H_L$ in each filed of view are thus obtained, and the average values of $H_H$ and $H_L$ in a plurality of (at least 3 or more) different fields of view is used as the measured values of $H_H$ and $H_L$.

It should be noted that since the layered structures of Cu and Ti are exhibited in parallel to the rolling direction, the above line analysis is necessarily performed in the thickness direction of the titanium copper foil.

(Definition of Ratio of Height of Higher Concentration Ti Layer to Height of Lower Concentration Ti Layer)

The ratio of the height of the higher concentration Ti layer to the height of the lower concentration Ti layer is defined as $H_H/H_L$ by using the $H_H$ and $H_L$ as described above.

In order to obtain the titanium copper foil as described above, it is necessary to appropriately adjust the $H_H/H_L$ in the above Ti concentration curve.

If the $H_H/H_L$ is lower, it will be difficult to obtain good low cycle fatigue characteristic. In order to obtain the above low cycle fatigue characteristic, the $H_H/H_L$ is preferably 1.1 or more, and more preferably 1.2 or more, and even more preferably 1.3 or more. However, although there is no demerit due to excessively high $H_H/H_L$, it is generally preferable to adjust it to 10 or less, and more preferably 8 or less, and even more preferably 5 or less, in view of labor and cost.

(Thickness of Titanium Copper Foil)

In an embodiment, the titanium copper foil according to the present invention has a thickness of, for example, 0.1 mm or less, and in a typical embodiment, a thickness of from 0.018 mm to 0.08 mm, and in a more typical embodiment, a thickness of from 0.02 mm to 0.06 mm.

[2. Method for Producing Titanium Copper Foil]

To produce the titanium copper foil as described above, raw materials such as electrolytic copper and Ti are first melted in a melting furnace to obtain a molten metal having a desired composition. The molten metal is then fed to a casting space of a mold where the molten metal is cast into an ingot. In order to prevent oxidative wear of titanium, the melting and casting are preferably carried out in a vacuum or in an inert gas atmosphere.

Here, in order to obtain the above predetermined layered structure of the titanium copper foil, it is important to adjust the mold and warm rolling conditions after hot rolling. By adjusting the mold and the warm rolling conditions, the height of the higher concentration Ti and the ratio of the higher concentration Ti layer to the height of the lower concentration Ti in the layered structure can be controlled.

The thickness of the mold is not specified, but it is desirable to adjust the thickness to the same level as that of the ingot. The thickness of a peripheral wall portion of the mold is measured along a direction parallel to the thickness of the ingot.

A suitable material of the peripheral wall portion of the mold can be refractory brick. Conventionally, cast iron or copper has been used as the material of the peripheral wall portion of the mold. However, by replacing this with the refractory brick, a cooling rate after feeding the molten metal can be reduced, thereby allowing slow cooling of the ingot. Then, by slowing down the cooling of the ingot, the layered structure of Ti can be adjusted.

Typically, the ingot is then subjected to hot rolling, warm rolling, cold rolling 1, a solutionizing treatment, cold rolling 2, and an aging treatment in this order to finish the ingot in the form of a foil having desired thickness and properties. Of course, the ingot may be finished into a strip in addition to the foil by the above method.

The hot rolling may be carried out under the customary conditions used in the method for producing titanium copper foil, and there are no special requirements herein. For example, in the hot rolling, a heating temperature is preferably 500° C. or more, and more preferably 700° C. or more, and even more preferably 900° C. or more, in terms of workability. However, the heating temperature is preferably 950° C. or less, in terms of a production efficiency.

Here, by introducing the warm rolling after the hot rolling, a distribution state of the higher concentration Ti layer in the layered structure is adjusted. The heating temperature in the warm rolling is preferably from 300 to 450° C., and more preferably from 320 to 430° C., and even more preferably from 350 to 420° C., in order to obtain good low cycle fatigue characteristic. Further, a heating holding time is preferably 5 hours or less, and more preferably 3 hours or less, and further preferably 2 hours or less, in terms of obtaining good low cycle fatigue characteristic. If the temperature is lower than the above temperature, the height of the higher concentration Ti layer becomes too high, which causes a decrease in etching property. Further, if the temperature is more than the above temperature or if the heating is carried out for a longer period of time, it will be difficult to obtain good low cycle fatigue characteristic. However, the heating holding time is preferably 1 hour or more, in terms of obtaining a tensile strength of 1100 MPa or more. An end temperature of the rolled material in the warm rolling is preferably 300° C. or more, in terms of suppressing cracks and the like due to a temperature difference.

Further, a rolling reduction ratio during the warm rolling is important for adjusting the ratio of the height of the higher concentration Ti layer to the height of the lower concentration Ti layer. However, an excessively high rolling reduction ratio results in embrittlement of the material, so that cracks tend to be generated. Therefore, in the present invention, the rolling reduction ratio during the warm rolling is less than 50%, and preferably 45% or less, and more preferably 40% or less. Further, an excessive low rolling reduction ratio tends to generate settling. Therefore, the rolling reduction ratio during the warm rolling is preferably 5% or more, and preferably 10% or more, and more preferably 20% or more. The rolling reduction ratio R (%) is defined by the following equation (3):

$$R=\{(t_0-t)/t_0\}\times 100, \quad \text{Equation (3)}$$

in which ($t_0$ is a thickness before rolling, and t is a thickness after rolling.

The subsequent cold rolling 1 may be carried out under conventional conditions used in the production of the titanium copper foil, and there are no special requirements herein. The solutionizing treatment may be carried out under conventional conditions, for example, at 700 to 1000° C. for 5 seconds to 30 minutes.

To obtain high strength, the cold rolling 2 can be carried out after the solutionizing treatment. The rolling reduction ratio of the cold rolling 2 is preferably more than 90%, and more preferably 95% or more. If the rolling reduction ratio is 90% or less, it will be difficult to obtain a tensile strength of 1100 MPa or more. The upper limit of the rolling reduction ratio is not particularly limited from the viewpoint of the strength intended by the present invention, but it does not industrially exceed 99.8%.

The aging treatment is carried out at a temperature of from 200 to 450° C. for a heating time of from 2 hours to 20 hours. If the heating temperature is lower than 200° C. or higher than 450° C., it will be difficult to obtain a tensile strength of 1100 MPa or more. If the heating time is less than 2 hours or more than 20 hours, it will be difficult to obtain a tensile strength of 1100 MPa or more.

In general, after the heat treatment, the surface may be washed with an acid or polished to remove an oxide film or an oxide layer formed on the surface. In the present invention, the surface also can be washed with an acid or polished after the heat treatment.

[3. Application]

The titanium copper foil according to the present invention can be suitably used as a material for electronic device parts, including, but not limited to, switches, connectors, jacks, terminals and relays, or as a rolled copper product, in particular as a conductive spring member for use in electronic device parts such as autofocus camera modules.

In one embodiment, the autofocus camera module includes: a lens; a spring member for elastically biasing the lens to an initial position in an optical axis direction; and an electromagnetic drive means configured to generate electromagnetic force for withstanding the biasing force of the spring member so that the lens can be driven in the optical axis direction. By way of example, the electromagnetic driving means includes: a U-shaped cylindrical yoke; a coil housed inside an inner peripheral wall of the yoke; and a magnet enclosing the coil and housed inside the outer peripheral wall of the yoke.

Figure 4:
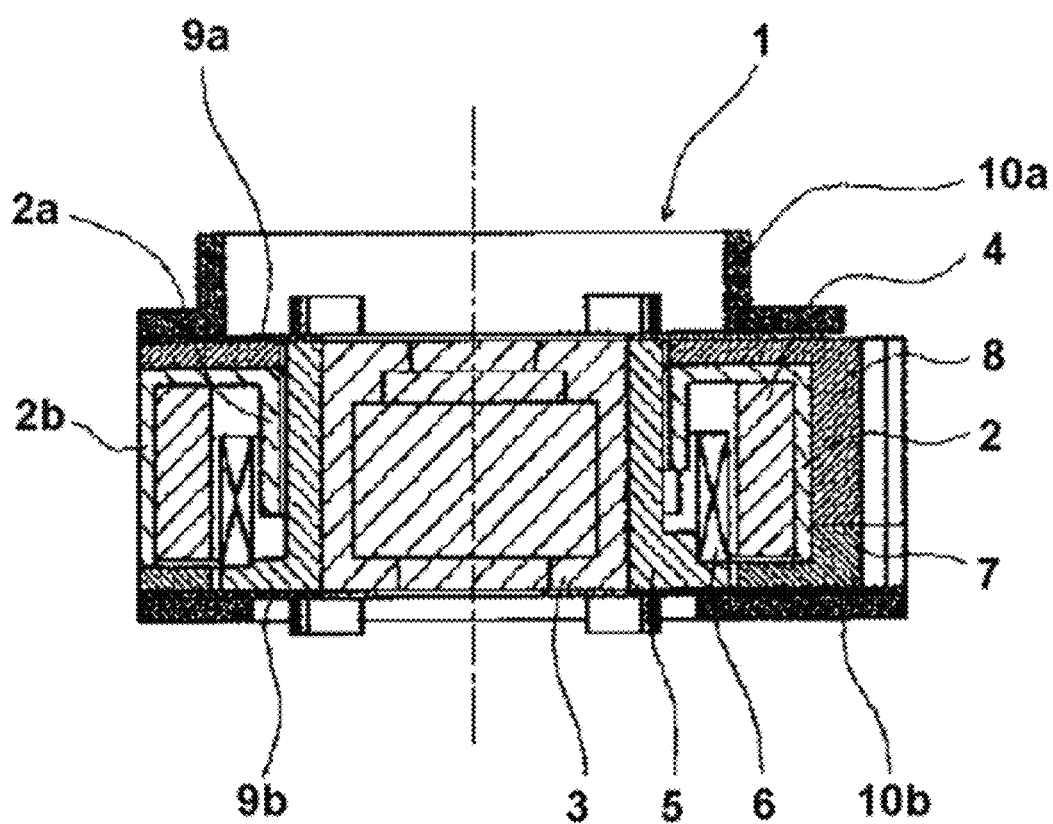
FIG. 4 is a cross-sectional view showing an autofocus camera module according to the present invention.
Figure 5:
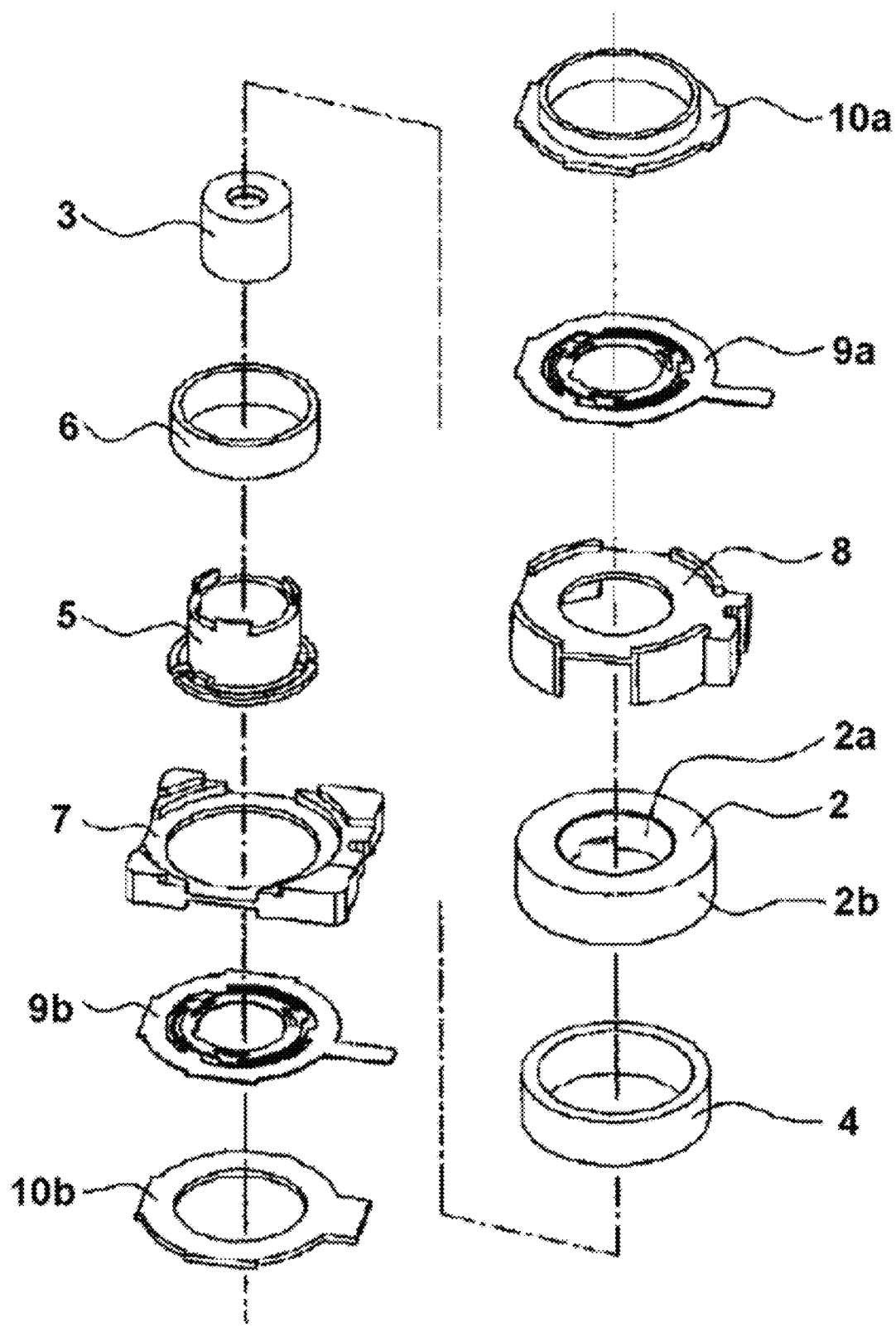
FIG. 5 is an exploded perspective view of the autofocus camera module in FIG. 4.
Figure 6:
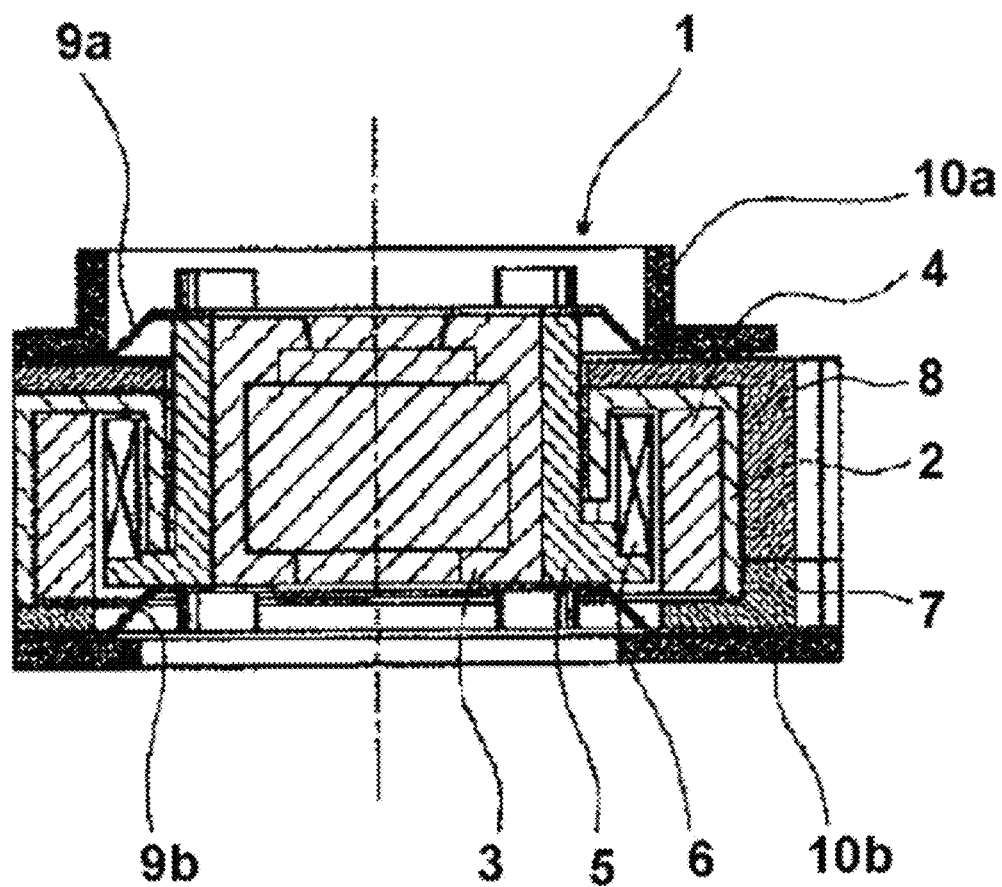
FIG. 6 is a cross-sectional view showing the operation of the autofocus camera module in FIG. 4.

FIG. 4 is a cross-sectional view showing an example of the autofocus camera module according to the present invention, FIG. 5 is an exploded perspective view of the autofocus camera module in FIG. 4, and FIG. 6 is a cross-sectional view showing the operation of the autofocus camera module in FIG. 4.

An autofocus camera module 1 includes: a U-shaped cylindrical yoke 2; a magnet 4 attached to an outer wall of the yoke 2; a carrier 5 provided with a lens 3 in a central position; a coil 6 attached to the carrier 5; a base 7 to which the yoke 2 is attached; a frame 8 supporting the base 7; two spring members 9a, 9b for supporting the carrier 5 at the upper and lower positions; and two caps 10a, 10b covering these upper and lower positions. These two spring member 9a, 9b are the same articles, and support the carrier 5 by holding it from the upper and lower positions in the same positional relationship, while functioning as a power supply route to the coil 6. The carrier 5 moves upward by applying an electric current to the coil 6. It should be noted that the wordings "upper" and "lower" are used herein as needed, and they refer to upper and lower in FIG. 4 and the upper represents a positional relationship that is directed from the camera to a subject.

The yoke 2 is a magnetic material such as soft iron, and assumes a U-shaped cylindrical shape whose upper surface portion is closed, and has cylindrical inner wall 2a and outer wall 2b. A ring-shaped magnet 4 is attached (adhered) to the inner surface of the U-shaped outer wall 2b.

The carrier 5 is a molded product made of a synthetic resin or the like, which has a cylindrical structure with a bottom portion, and the carrier 5 supports the lens in the central position, and binds the pre-formed coil 6 onto the bottom surface outwardly so that the coil 6 is mounted thereon. The yoke 2 is integrated by fitting it to the inner periphery of the base 7 which is a rectangular resin molded article, and the whole yoke 2 is further secured by the frame 8 which is a resin molded article.

The spring members 9a, 9b are fixed by holding their outermost peripheral portions by the frame 8 and the base 7, respectively, and the cutout grooves arranged per 120° on the inner peripheral portion are fitted to the carrier 5 and fixed by thermal caulking or the like.

The spring member 9b and the base 7 as well as the spring member 9a and the frame 8 are fixed by adhesive and thermal caulking, respectively, and further the cap 10b is attached to the bottom surface of the base 7, and the cap 10a is attached to the upper portion of the frame 8, and the spring member 9b is sandwiched between the base 7 and the cap 10b and the spring member 9a is sandwiched between the frame 8 and the cap 10a, so that they are adhered.

The lead wire of one of the coils 6 is extended upward passing through the groove provided on the inner peripheral surface of the carrier 5, and soldered to the spring member 9a. The other lead wire is extended downward passing through the groove provided on the bottom surface of the carrier 5, and soldered to the spring member 9b.

The spring members 9a, 9b are plate springs made of the titanium copper foil according to the present invention. They have spring properties and elastically energize the lens 3 to the initial position in the optical axis direction. At the same time, they also act as power supply paths to the coil 6. One position on the outer peripheral portion of each of the spring members 9a, 9b projects outward, thereby acting as a power supply.

The cylindrical magnet 4 is magnetized in the radial (diameter) direction and forms a magnetic path passing through an inner wall 2a, an upper surface portion and an outer wall 2b of the U-shaped yoke 2, and the coil 6 is disposed in the gap between the magnet 4 and the inner wall 2a.

The spring members 9a, 9b have the same shape, and are attached in the same positional relationship as shown in FIGS. 4 and 5, so that any axial deviation can be suppressed when the carrier 5 is moved upward. Since the coil 6 is manufactured by pressure molding after winding, the accuracy of the finished outer diameter of the coil can be improved, thereby allowing the coil to be easily arranged in a predetermined narrow gap. The carrier 5 is butted to the base 7 at the lowest position and butted to the yoke 2 at the uppermost position, and it will be thus equipped with the butting mechanisms in the upper and bottom vertical direction, thereby preventing any detachment.

FIG. 6 shows a sectional view when upwardly moving the carrier 5 having the lens 3 for the autofocus by applying an electric current to the coil 6. When a voltage is applied to the power supply terminals of the spring members 9a, 9b, the electric current flows through the coil 6, and the upward electromagnetic force acts on the carrier 5. On the other hand, restoring force of two linked spring members 9a, 9b downwardly acts on the carrier 5. Therefore, the distance of upward movement of the carrier 5 will be a position where the electromagnetic force and the restoring force are balanced. This will allow determination of the moving amount of the carrier 5 according to the amount of the electric current applied to the coil 6.

Since the upper spring member 9a supports the upper surface of the carrier 5 and the lower spring member 9b support the lower surface of the carrier 5, the restoring force will equally work downward on the upper and lower surfaces of the carrier 5, so that any axial displacement of the lens 3 can be suppressed.

Therefore, for the upward movement of the carrier 5, no guide by ribs and the like is needed and used. Since there is no sliding friction by the guide, the amount of movement of the carrier 5 will be purely controlled by the balance between the electromagnetic force and the restoring force, thereby achieving the smooth and accurate movement of the lens 3. This will achieve autofocusing with reduced blurring of the lens.

It should be noted that although the magnet 4 has been described as one having the cylindrical shape, the magnet is not limited to this shape, and may be divided 3 to 4 parts and magnetized in the radial direction, which may be fixed by adhering to the inner surface of the outer wall 2b of the yoke 2.

EXAMPLES

Hereinafter, Examples of the present invention will be illustrated, but these Examples are presented in order to provide better understanding of the present invention and its advantages, and in no way intended to limit the present invention.

Each alloy containing the alloy components shown in Table 1, the balance being copper and inevitable impurities, was used as an experimental material, and effects of the alloy components and production conditions on the structure, tensile strength, low cycle fatigue characteristic, etching property and settling were studied.

<Production Conditions>

First, 2.5 kg of electrolytic copper was melted in a vacuum melting furnace, and alloy elements were added such that each alloy composition as shown in Tables 1 and 2 was obtained. The molten metal was cast into a mold as shown below to produce an ingot having a thickness of 30 mm, a width of 60 mm, and a length of 120 mm. The ingot was processed in the following step order to produce each product sample having each predetermined thickness as shown in Tables 1 and 2.

(1) Melting Casting: The casting temperature was 1300° C., the mold was selected from refractory brick, and cast iron, and an average cooling rate during casting was changed. The cooling rate is higher in the order of cast iron, and refractory brick. The mold thickness was 30 mm.

(2) Hot Rolling: The above ingot was further heated and held at 950° C. for 3 hours and then rolled to a thickness of 10 mm.

(3) Warm Rolling: The hot-rolled material was heated and held at 300 to 450° C. for 2 hours, and then rolled to a predetermined thickness depending on the rolling reduction ratio. The end temperature was 300° C. or more.

(4) Grinding: The oxide scale produced in hot rolling was removed by a grinder. The thickness after grinding was 9 mm.

(5) Cold rolling 1: The material was rolled to a predetermined thickness depending on the rolling reduction ratio in a cold rolling 2 and the thickness of the product sample.

(6) Solutionizing Treatment: The sample was charged with an electric furnace 1 heated to 800° C. and maintained for 5 minutes, and the sample was quenched by placing it in a water bath.

(7) Cold Rolling 2: It was rolled at each rolling reduction ratio as shown in Tables 1 and 2 to each product thickness.

(8) Aging Treatment: The sample was heated in an Ar atmosphere at a temperature of 300° C. for 2 hours.

The following evaluations were performed for each product sample produced as described above.

<1. Structural Analysis>

As described above, the cross section parallel to the rolling direction was observed with STEM-EDX (scanning transmission electron microscope), and it was determined whether the structure was layered or speckled from the resulting image. The scanning transmission electron microscope used herein was JEM-2100F from JEOL, and the measurement conditions were a sample tilt angle of 0° and an acceleration voltage of 200 kV.

Further, the cross section parallel to the rolling direction was subjected to the line analysis in the thickness direction with STEM-EDX to obtain a Ti concentration curve for a distance in the thickness direction. The Ti concentration was measured in three different fields of view, and the $H_H$ and $H_L$ represented by the following equations (1) and (2) were measured in each field of view, and an average value in the different fields of view was used as the measured value.

$$H_H=\{(A_1-B)+(A_2-B)+(A_3-B)+(A_4-B)+(A_5-B)\}/5;$$
and  Equation (1)

$$H_L=\{(B-C_1)+(B-C_2)+(B-C_3)+(B-C_4)+(B-C_5)\}/5.$$  Equation (2)

Furthermore, structure analysis was carried out with STEM-EDX by the method as described above. The results are shown in Table 1.

<2. Tensile Strength>

The tensile strength in the direction parallel to the rolling direction was measured in accordance with JIS Z2241: 2011 using a tensile tester.

<3. Low Cycle Fatigue Characteristic>

The low cycle fatigue characteristic was evaluated using a MIT tester (D type) from Toyo Seiki Seisaku-sho, Ltd. Each strip sample having a width of 3.2 mm and a length of 110 mm was collected such that the longitudinal direction was a rolling parallel direction, and the measurement was carried out under conditions of a load of 250 g, a radius of curvature of a bent portion of 2 mm, left and right bending angles of 135°, and a bending rate of 175 cpm (times/min), and under other conditions in accordance with JIS P 8115: 2001. For each sample, a sample in which the number of repeats until fracture was 1000 or more was evaluated as "⊚", a sample in which the number of repeats until fracture was 800 or more and less than 1000 was evaluated "○", and a sample in which the number of repeats until fracture was less than 800 was evaluated as "x".

<4. Settling>

Each strip sample having a width of 15 mm and a length of 25 mm was collected such that the longitudinal direction was parallel to the rolling direction, and, as shown in FIG. 7, one end of the sample was fixed, and a punch with a tip processed into a knife edge was pressed at a moving rate of 1 mm/min at a position of a distance L from that fixed end to provide the sample with deflection of the distance d. The punch was then returned to its initial position and unloaded. After unloading, an amount of settling δ was determined.

The test conditions were L=3 mm and d=2 mm when the foil thickness of the sample was 0.05 mm or less, and L=5 mm and d=4 mm when the foil thickness was thicker than 0.05 mm. Further, the amount of settling was measured at a resolution of 0.01 mm, and when the settling was not detected, it was expressed as "<0.01 mm" in Tables 1 and 2.

<5. Etching Linearity>

Each sample foil was etched with an aqueous solution having 37% by mass ferric chloride and a Baume degree of 40° to form a linear circuit having a line width of 100 μm and a length of 150 mm. The circuit was observed using a scanning electron microscope (S-4700 from Hitachi) (an observation length of 200 μm), and a sample in which a difference between the maximum circuit width and the minimum circuit width was less than 10 μm was evaluated as "○", and a sample in which it was 10 μm or more was evaluated as "x".

TABLE 1

| | Product Thickness (mm) | Alloy Composition Main Component (% by mass) | Alloy Composition Sub-Component (% by mass) | Mold | Warm Rolling Heating Conditions | Warm Rolling Reduction Ratio (%) | Cold Rolling 2 Reduction Ratio (%) | $H_H$ (% by mass) | $H_H/H_L$ | Evaluation Results of Structure Analysis | Tensile Strength (MPa) | Low Cycle Fatigue Characteristic | Setting (mm) | Etching Property |
|---|---|---|---|---|---|---|---|---|---|---|---|---|---|---|
| Example 1 | 0.03 | Cu-3.2% Ti | — | Refractory Brick | 350° C. × 2 h | 5 | 98 | 3.2 | 1.1 | Layered | 1346 | ◎ | <0.01 | ◯ |
| Example 2 | 0.03 | Cu-3.2% Ti | — | Refractory Brick | 350° C. × 2 h | 10 | 98 | 3.3 | 1.3 | Layered | 1432 | ◎ | <0.01 | ◯ |
| Example 3 | 0.03 | Cu-3.2% Ti | — | Refractory Brick | 350° C. × 2 h | 20 | 98.2 | 3.2 | 1.4 | Layered | 1462 | ◎ | <0.01 | ◯ |
| Example 4 | 0.03 | Cu-3.2% Ti | — | Refractory Brick | 350° C. × 2 h | 30 | 98 | 3.0 | 1.8 | Layered | 1456 | ◎ | <0.01 | ◯ |
| Example 5 | 0.03 | Cu-3.2% Ti | — | Refractory Brick | 300° C. × 2 h | 20 | 98 | 12.0 | 1.6 | Layered | 1413 | ◎ | <0.01 | ◯ |
| Example 6 | 0.03 | Cu-3.2% Ti | — | Refractory Brick | 350° C. × 2 h | 20 | 98 | 3.2 | 1.3 | Layered | 1436 | ◎ | <0.01 | ◯ |
| Example 7 | 0.03 | Cu-3.2% Ti | — | Refractory Brick | 390° C. × 2 h | 20 | 98 | 2.8 | 1.4 | Layered | 1379 | ◎ | <0.01 | ◯ |
| Example 8 | 0.03 | Cu-3.2% Ti | — | Refractory Brick | 420° C. × 2 h | 20 | 98 | 2.1 | 1.1 | Layered | 1382 | ◎ | <0.01 | ◯ |
| Example 9 | 0.03 | Cu-3.2% Ti | — | Refractory Brick | 450° C. × 2 h | 20 | 98 | 1.0 | 1.1 | Layered | 1422 | X | <0.01 | ◯ |
| Example 10 | 0.018 | Cu-3.2% Ti | — | Refractory Brick | 350° C. × 2 h | 20 | 98 | 3.6 | 1.9 | Layered | 1470 | ◎ | <0.01 | ◯ |
| Example 11 | 0.05 | Cu-3.2% Ti | — | Refractory Brick | 350° C. × 2 h | 20 | 98 | 3.3 | 1.6 | Layered | 1425 | ◎ | <0.01 | ◯ |
| Example 12 | 0.08 | Cu-3.2% Ti | — | Refractory Brick | 350° C. × 2 h | 20 | 98 | 3.2 | 1.5 | Layered | 1411 | ◎ | <0.01 | ◯ |
| Example 13 | 0.1 | Cu-3.2% Ti | — | Refractory Brick | 350° C. × 2 h | 20 | 98 | 3.1 | 1.9 | Layered | 1380 | ◎ | 0.1 | ◯ |
| Example 14 | 0.03 | Cu-3.2% Ti | — | Refractory Brick | 350° C. × 2 h | 20 | 98 | 1.0 | 1.1 | Layered | 1080 | ◯ | 0.056 | ◯ |
| Example 15 | 0.03 | Cu-3.2% Ti | — | Refractory Brick | 350° C. × 2 h | 20 | 98 | 2.4 | 1.4 | Layered | 1102 | ◯ | 0.032 | ◯ |
| Example 16 | 0.03 | Cu-3.2% Ti | — | Refractory Brick | 350° C. × 2 h | 20 | 98 | 3.8 | 1.5 | Layered | 1143 | ◯ | <0.01 | ◯ |
| Example 17 | 0.03 | Cu-3.2% Ti | — | Refractory Brick | 350° C. × 2 h | 20 | 98 | 6.3 | 1.8 | Layered | 1473 | ◎ | <0.01 | ◯ |
| Example 18 | 0.03 | Cu-3.2% Ti | — | Refractory Brick | 350° C. × 2 h | 20 | 98 | 6.7 | 1.8 | Layered | 1509 | ◎ | <0.01 | ◯ |
| Example 19 | 0.03 | Cu-3.2% Ti | — | Refractory Brick | 350° C. × 2 h | 20 | 98 | 7.2 | 2.0 | Layered | 1535 | ◎ | <0.01 | ◯ |
| Example 20 | 0.03 | Cu-3.2% Ti | 0.2% Fe | Refractory Brick | 350° C. × 2 h | 20 | 98 | 3.5 | 1.5 | Layered | 1483 | ◎ | <0.01 | ◯ |
| Example 21 | 0.03 | Cu-3.2% Ti | 0.1% Ag-0.1% Co-0.1% Ni 0.05% Si-0.1% Ni-0.1% | Refractory Brick | 350° C. × 2 h | 20 | 98 | 4.5 | 1.9 | Layered | 1472 | ◎ | <0.01 | ◯ |
| Example 22 | 0.03 | Cu-3.2% Ti | — | Refractory Brick | 350° C. × 2 h | 20 | 98 | 3.5 | 1.3 | Layered | 1473 | ◎ | <0.01 | ◯ |
| Example 23 | 0.03 | Cu-3.2% Ti | Zr-0.1% Mg 0.05% B-0.5% Mo-0.4% Cr | Refractory Brick | 350° C. × 2 h | 20 | 98 | 5.2 | 1.1 | Layered | 1467 | ◎ | <0.01 | ◯ |
| Example 24 | 0.03 | Cu-3.2% Ti | 0.1% Co-0.1% Mn | Refractory Brick | 350° C. × 2 h | 20 | 98 | 3.3 | 1.5 | Layered | 1512 | ◎ | <0.01 | ◯ |
| Example 25 | 0.03 | Cu-3.2% Ti | 0.05% Si-0.1% P | Refractory Brick | 350° C. × 2 h | 20 | 98 | 5.0 | 1.7 | Layered | 1502 | ◎ | <0.01 | ◯ |
| Example 26 | 0.03 | Cu-3.2% Ti | — | Refractory Brick | 350° C. × 2 h | 20 | 90 | 3.1 | 1.1 | Layered | 1052 | X | 0.3 | ◯ |

It was confirmed from Examples 1 to 26 that a titanium copper foil having an improved etching property, higher strength and lower settling could be obtained.

In Examples 1 to 8, 10 to 13 and 15 to 25, the temperature and the rolling reduction ratio during the warm rolling satisfied the appropriate ranges, so that the $H_H$ satisfied 1.0 or more and the ratio $H_H/H_L$ satisfied 1.1 or more, and both of the low cycle fatigue characteristic and suppression of settling could be achieved.

In Example 9, the $H_H$ satisfied 1.0 or more and the ratio $H_H/H_L$ satisfied 1.1 or more, so that good strength could be obtained, and settling could be suppressed. However, the warm rolling time was slightly longer, so that the low cycle fatigue characteristic was lower.

In Example 14, the Ti concentration in the matrix was slightly lower, so that the tensile strength was slightly lower and the settling was slightly higher than in Examples 1 to 13 and 15 to 25. However, it carried out the appropriate warm rolling, so that the $H_H$ satisfied 1.0 or more and the ratio $H_H/H_L$ satisfied 1.1 or more, and the low cycle fatigue characteristic was good.

In Example 26, the $H_H$ satisfied 1.0 or more and the ratio $H_H/H_L$ satisfied 1.1 or more, but the rolling reduction ratio during cold rolling 2 was 90% or less, so that good strength and low cycle fatigue characteristic were not obtained.

In Comparative Example 1, the rolling reduction ratio during warm rolling was lower, so that the ratio $H_H/H_L$ was lower than 1.1, and settling occurred.

In Comparative Example 2, the rolling reduction ratio during warm rolling was higher, so that cracks occurred in the subsequent rolling, and the sample was not prepared and the strength, low cycle fatigue characteristic and settling could not be measured.

In Comparative Example 3, the temperature of the warm rolling was lower, so that the $H_H$ was more than 30% by mass and the etching property was deteriorated.

In Comparative Example 4, the temperature of the warm rolling was higher, so that the $H_H$ was less than 1.0% by mass, and the material was fractured in the MIT test.

In Comparative Example 5, the Ti concentration in the matrix was more than 5% by mass, so that cracks occurred in the hot rolling, and the sample could not be prepared and the strength and settling could not be measured.

In Comparative Example 6, the total amount of the sub-components was more than 1.0% by mass, so that cracks occurred in the hot rolling, and the sample could not be prepared and the strength and settling could not be measured.

In Comparative Example 7, the mold was made of cast iron, so that the ingot was rapidly cooled due to the material

TABLE 2

| | Product Thickness (mm) | Alloy Composition Main Component (% by mass) | Alloy Composition Sub-Component (% by mass) | Mold | Warm Rolling Heating Conditions | Warm Rolling Reduction Ratio (%) | Cold Rolling 2 Reduction Ratio (%) | $H_H$ (% by mass) |
|---|---|---|---|---|---|---|---|---|
| Comparative Example 1 | 0.03 | Cu-3.2% Ti | — | Refractory Brick | 350° C. × 2 h | 4 | 98 | 3.3 |
| Comparative Example 2 | 0.03 | Cu-3.2% Ti | — | Refractory Brick | 350° C. × 2 h | 50 | Cracks occured during rolling | |
| Comparative Example 3 | 0.03 | Cu-3.2% Ti | — | Refractory Brick | 280° C. × 2 h | 20 | 98 | 31 |
| Comparative Example 4 | 0.03 | Cu-3.2% Ti | — | Refractory Brick | 460° C. × 2 h | 20 | 98 | 0.5 |
| Comparative Example 5 | 0.03 | Cu-3.2% Ti | — | Refractory Brick | Cracks occured during hot rolling | | | |
| Comparative Example 6 | 0.03 | Cu-3.2% Ti | 0.1% Si-0.2% Ni-0.5% Zr-0.5% Mg | Refractory Brick | Cracks occured during hot rolling | | | |
| Comparative Example 7 | 0.03 | Cu-3.2% Ti | — | Cast Iron | 350° C. × 2 h | 20 | 98 | — |
| Comparative Example 8 | 0.03 | Cu-3.2% Ti | — | Refractory Brick | — | — | 98 | 32.3 |

| | $H_H/H_L$ | Evaluation Results of Structure Analysis | Tensile Strength (MPa) | Low Cycle Fatigue Characteristic | Setting (mm) | Etching Property |
|---|---|---|---|---|---|---|
| Comparative Example 1 | 0.8 | Layered | 1420 | ◎ | 0.08 | ○ |
| Comparative Example 2 | | Cracks occured during rolling | | | | |
| Comparative Example 3 | 1.5 | Layered | 1308 | ◎ | <0.01 | X |
| Comparative Example 4 | 0.8 | Layered | 1400 | X | 0.1 | ○ |
| Comparative Example 5 | | Cracks occured during hot rolling | | | | |
| Comparative Example 6 | | Cracks occured during hot rolling | | | | |
| Comparative Example 7 | — | Speckled | 1413 | X | 0.1 | ○ |
| Comparative Example 8 | 0.6 | Layered | 1424 | ○ | 0.03 | X | of the mold, and the structure became speckled and fractured in the MIT test. Further, settling occurred.

In Comparative Example 8, the warm rolling was not carried out, so that the $H_H$ was more than 30% by mass and the ratio $H_H/H_L$ was less than 1.1, which caused deterioration of the etching property.

DESCRIPTION OF REFERENCE NUMERALS 1 autofocus camera module
2 yoke
3 lens
4 magnet
5 Carrier
6 coil
7 base
8 frame
9a spring member on upper side
9b spring member on lower side
10a, 10b cap

The invention claimed is:

1. A titanium copper foil comprising from 1.5% by mass to 5.0% by mass of Ti, the balance being Cu and inevitable impurities, wherein in a Ti concentration curve obtained by analyzing a cross section parallel to a rolling direction along a thickness direction by STEM-EDX, a lower concentration Ti layer having a Ti concentration less than an average value of Ti concentrations in the Ti concentration curve and a higher concentration Ti layer having a Ti concentration equal to or higher than the average value of the Ti concentrations in the Ti concentration curve are alternately present in a thickness direction, and wherein the titanium copper foil satisfies 1.0% by mass$\leq H_H \leq$30% by mass, and $H_H/H_L \geq 1.1$, in which $H_H$ and $H_L$ are as defined in the present specification.

2. The titanium copper foil according to claim 1, wherein the titanium copper foil has a number of bends of 800 or more when a MIT test according to JIS P 8115: 2001 is conducted in a direction parallel to the rolling direction.

3. The titanium copper according to claim 1, wherein the titanium copper foil has a tensile strength of 1100 MPa or more in a direction parallel to the rolling direction.

4. The titanium copper according to claim 1, further comprising one or more elements selected from Ag, B, Co, Fe, Mg, Mn, Mo, Ni, P, Si, Cr, and Zr in a total amount of 1.0% by mass or less.

5. A copper rolled product comprising the titanium copper foil according to claim 1.

6. An electronic device part comprising the titanium copper foil according to claim 1.

7. The electronic device part according to claim 6, wherein the electronic device part is an autofocus camera module.

8. An autofocusing camera module comprising: a lens; a spring member for elastically biasing the lens to an initial position in an optical axis direction; and an electromagnetic driver configured to generate electromagnetic force for withstanding a biasing force of the spring member so that the lens can be driven in the optical axis direction, wherein the spring member comprises the titanium copper foil according to claim 1.

* * * * *

UNITED STATES PATENT AND TRADEMARK OFFICE
CERTIFICATE OF CORRECTION

PATENT NO. : 11,739,397 B2
APPLICATION NO. : 17/290825
DATED : August 29, 2023
INVENTOR(S) : Kenta Tsujie It is certified that error appears in the above-identified patent and that said Letters Patent is hereby corrected as shown below:

In the Specification

At Column 6, Line 16, "titanium foil copper" should be -- titanium copper foil --.

In the Claims

At Column 22, Line 9, "copper" should be -- copper foil --.

At Column 22, Line 12, "copper" should be -- copper foil --.

Signed and Sealed this
Fifth Day of November, 2024

Katherine Kelly Vidal
*Director of the United States Patent and Trademark Office*